United States Patent Office 2,872,474
Patented Feb. 3, 1959

2,872,474

REACTION PRODUCTS OF NaBH₄ AND CO₂

Richard K. Pearson, Zelienople, and Thomas Wartik, State College, Pa., assignors to Callery Chemical Company, Pittsburgh, Pa., a corporation of Pennsylvania No Drawing. Application June 22, 1955
Serial No. 517,382

10 Claims. (Cl. 260—462)

This invention relates to the preparation of new and useful reaction products of sodium borohydride and excess carbon dioxide and more particularly it relates to the preparation of sodium formatomethoxyborate, $NaBO(OCH_3)(O_2CH)$, and sodium triformatoborohydride, $NaBH(O_2CH)_3$.

It is an object of this invention to provide a method for preparing two new compositions of matter referred to as sodium formatomethoxyborate to which has been assigned the formula $NaBO(OCH_3)(O_2CH)$, and sodium triformatoborohydride to which has been assigned the formula $NaBH(O_2CH)_3$.

Another object is to provide a method whereby anhydrous carbon dioxide reacts with sodium borohydride in a molar ratio of 2:1 or 3:1 to form new and useful compositions of matter containing boron.

A still further object is to prepare two new compounds by the reaction of carbon dioxide and sodium borohydride which may be decomposed to yield other valuable products such as trimethyl borate, methyl formate and formic acid.

These new and useful compositions of matter and methods for preparing and using the same will be more fully described in the specification and the novelty thereof will be particularly pointed out and distinctly claimed.

This invention is based upon the discovery that NaBH₄ and excess CO₂ will react in the absence of air to form two different products depending upon how the reaction is carried out and the temperature at which it is performed. Thus, the reactions which occur may be summarized as follows:

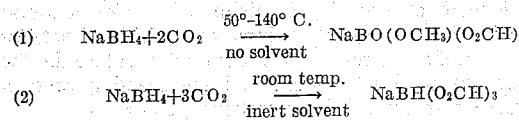

Reaction 1 above is carried out by allowing NaBH₄ and excess CO₂ to stand in a glass tube in the absence of air at temperatures within the range indicated. The solid in the tube swells gradually until a volume about 4 times that of the original NaBH₄ has been attained. At 125° C., the volume change is complete in about 12 hours but at 70° C., the time required is about one week. When the reaction is complete, two mols of CO₂ are absorbed for every mol of NaBH₄ used. Reaction 2 above is carried out by condensing an excess of CO₂ into a mixture of NaBH₄ and an inert solvent such as dimethyl ether by cooling with liquid nitrogen. The mixture is gradually warmed with constant stirring. At room temperature, the solid swells gradually until after 10 hours it has a volume about 8 times as great as the NaBH₄ used. When the reaction is complete, three mols of CO₂ are absorbed for every mol of NaBH₄ used.

In several reactions which were carried out at 125° C. using no solvent, the following data was obtained.

| Run No. | mmols of NaHB₄ | mmols CO₂ absorbed | Ratio of CO₂ to NaBH₄ in Resulting Product |
|---|---|---|---|
| 1 | 9.37 | 18.27 | 1.95 |
| 2 | 2.94 | 5.85 | 1.99 |
| 3 | 2.86 | 5.68 | 1.99 |
| 4 | 13.39 | 26.11 | 1.95 |

These experiments confirm the fact that when NaBH₄ is carbonated with CO₂ under these conditions two mols of the latter compound always react with one mol of the former compound. Other evidence indicates that a substituted sodium borohydride is formed according to the following equation.

The reaction product is a white solid which decomposes at elevated temperatures to yield trimethyl borate and methyl formate. It reacts with water as follows:

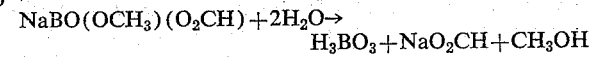

Evidence supporting the assigned formula for the reaction product is as follows: (1) The observed stoichiometry of the reactants is in accord with the equation given for the formation of a material with the foregoing formula. Other equations involving the same reacting proportions may be written as follows:

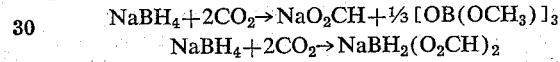

The first equation can be ruled out based on the observation that the reaction product was not soluble in benzene while $[OB(OCH_3)]_3$ is definitely known to be soluble in benzene. The second equation is also unlikely in view of the fact that hydrolysis of the material in question yielded only trace quantities of hydrogen instead of the two mols for one to be expected of $NaBH_2(O_2CH)_2$. (2) Hydrolysis of the reaction product obtained yielded the correct amount of methyl alcohol. In several hydrolysis experiments which were caried out, it was found that 52.3% (the average of several experiments) of the carbon originally used as carbon dioxide was converted to methoxy groups. (3) The presence of the formate group was demonstrated by two methods. In the first method, the hydrolysis product after evaporation of the methyl alcohol was titrated with potassium permanganate solution and the volume of the latter was found to correspond closely to that exepected on the basis of the oxidation of the calculated amount of sodium formate. In the second method, treatment of the original reaction product with concentrated sulfuric acid yielded the amount of carbon monoxide expected from a compound of the proposed formula.

Decomposition of the solid product obtained yields two volatile products, trimethyl borate and methyl formate as follows:

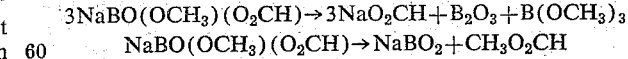

The first decomposition reaction is dependent upon the temperatures used since the amount of trimethyl borate formed can be greatly decreased by lowering the reaction temperature. At 125° C., 20% of the carbon in the carbon dioxide used appears in the form of trimethyl borate and 6% as methyl formate. At 70° C., the corresponding figures were 5% trimethyl borate and 4% methyl formate. Heating the solid to temperatures higher than those employed in the initial reaction causes the evolution of much greater quantities of trimethyl borate and methyl formate. It was also observed that the rate of absorption of carbon dioxide by sodium borohydride reaches a maximum at about 140° C. This temperature was not used, however, since the tendency for secondary reactions to occur at 140° C. was quite pronounced.

Attempts to recrystallize the reaction product from various solvents were not successful since the solid was not appreciably soluble in the solvents used, i. e., benzene, diethyl ether, isopropylamine and dimethoxyethane. Although methyl alcohol dissolved the solid product completely, it did so by reacting with the latter which resulted in conversion of most of the boron in the original solid to volatile trimethyl borate.

The foregoing analysis of this compound and other tests performed upon it show that it can be assigned the formula $NaBO(OCH_3)(O_2CH)$ and that it is a substituted sodium borohydride of a type not previously reported. This compound according to currently accepted nomenclature for boron compounds, should be called sodium formatomethoxyborate.

In another experiment, sodium triformatoborohydride was prepared as follows: in a 300 ml. heavy-walled reaction tube was placed 14.94 millimols of $NaBH_4$. The reaction tube was then connected to a vacuum system and 85.8 millimols of $CO_2$ followed by 9.47 g. of dimethyl ether were condensed into it by cooling with liquid nitrogen. While the reaction tube was being warmed, stirring was initiated by means of a magnetic stirrer. When the reaction tube reached room temperature, the solid it contained began to swell gradually until after 10 hours it appeared to have a volume 6 to 8 times as great as the $NaBH_4$ used. Continued stirring for 26 more hours did not change the volume further. The reaction tube was then opened to the vacuum system and its volatile contents were removed by pumping to a cold trap maintained at −196° C. After the components of this gaseous mixture were separated by fractional condensation, 41.0 millimols of $CO_2$ were found not to have been absorbed. A 0.64 g. sample of the white solid reaction product obtained was found to liberate 3.56 millimols of hydrogen when treated with hydrochloric acid. Another 0.50 g. sample of the reaction product was hydrolyzed with dilute sulfuric acid to form 2.98 millimols of boric acid and 8.27 millimols of formic acid. The quantitative results thus obtained show that since the molar reaction ratio of $CO_2$ to $NaBH_4$ was 2.99 to 1 that the indicated composition of the product is sodium triformatoborohydride, $NaBH(O_2CH)_3$.

Agreement of the analytical results with those calculated for the postulated product is shown in the following table in which the values are based on one gram of sample:

|  | Observed | Calculated for $NABH(O_2CH)_3$ |
| --- | --- | --- |
| $H_2$ by hydrolysis_____mmols/g__ | 5.54 | 5.89 |
| Boron_____mats/g__ | 5.94 | 5.89 |
| —$O_2CH$_____mmols/g__ | 16.49 | 17.69 |

The product thus prepared represents the first reported case of a formato-substituted borohydride. The observed diviation of the analytical values from those calculated is undoubtedly due to the slow decomposition of the solid to yield methyl formate. This latter substance is obtained in appreciable quantity when sodium triformatoborohydride is heated to the temperature at which it appears to melt (about 125° C.). In view of the fact that the product obtained at 125° C. was markedly different from that obtained at room temperature, it was thought possible that the reaction at room temperature might be an incomplete reaction which would produce the other product when heated to a higher temperature. Experiments were carried out which showed that no such conversion took place.

Both of the compositions of matter described are useful as intermediates in the preparation of certain organic compounds from carbon dioxide. Sodium formatomethoxyborate may be pyrolyzed to produce trimethyl borate and methyl formate. It can also be hydrolyzed to produce boric acid, sodium formate and methanol. Sodium triformatoborohydride can be pyrolyzed to form methyl formate or it can be hydrolyzed to form formic acid. Both compounds may also be used to prepare organic compounds "labeled" with a predetermined proportion of carbon-14. Carbon which has been enriched in the mass 14 isotope can be burned to produce $CO_2$ containing a substantial amount of carbon-14. The carbon dioxide thus formed can be enriched in $C^{14}O_2$ content by standard gaseous isotopic separation processes, such as fractional diffusion, thermal diffusion and the like. The $CO_2$ containing a predetermined amount of $C^{14}O_2$ can then be reacted with $NaBH_4$ to form our new compounds which may then be pyrolyzed or hydrolyzed to produce organic compounds as above described, but having a predetermined concentration of carbon-14 sufficient for radioactive tracer studies.

This application is a continuation-in-part of our copending application Serial No. 464,900, filed October 26, 1954, now abandoned, entitled "Preparation of Sodium Formatomethoxyborate."

Having thus described out invention fully and completely as required by the patent laws, what we claim and desire to secure by United States patent is:

1. A method of preparing a reaction product of sodium borohydride and carbon dioxide which comprises reacting sodium borohydride and dry carbon dioxide in the absence of air, in a molar ratio of carbon dioxide to the borohydride of at least about 2 to 1, and recovering the reaction product thus formed.

2. A method of preparing a reaction product of sodium borohydride and carbon dioxide selected from the group consisting of sodium formatomethoxyborate, $$NaBO(OCH_3)(O_2CH)$$

and sodium triformatoborohydride, $NaBH(O_2CH)_3$, which comprises reacting sodium borohydride and dry carbon dioxide in the absence of air, in a molar ratio of carbon dioxide to sodium borohydride of at least 2 to 1 and at a temperature up to about 140° C., and recovering the resulting reaction product formed.

3. A method according to claim 2 in which the reaction is carried out at a temperature within the range of about 50° C. to 140° C. and the reaction product recovered is sodium formatomethoxyborate, $$NaBO(OCH_3)(O_2CH)$$

4. A method according to claim 2 in which a molar ratio of carbon dioxide to sodium borohydride of not less than about 3:1 is reacted at room temperature in the presence of an inert solvent and the reaction product recovered is sodium triformatoborohydride, $$NaBH(O_2CH)_3$$

5. A method according to claim 4 in which the inert solvent is dimethyl ether.

6. A method according to claim 2 in which said reaction product is decomposed by pyrolysis by heating at a temperature of about 70° to 125° C. to produce organic decomposition products and the resulting organic compounds are recovered.

7. A method according to claim 2 in which said reaction product is decomposed by hydrolysis.

8. A compound selected from the group consisting of sodium formatomethoxyborate, $NaBO(OCH_3)(O_2CH)$, and sodium triformatoborohydride, $NaBH(O_2CH)_3$.

9. The compound sodium formatomethoxyborate, $NaBO(OCH_3)(O_2CH)$.

10. The compound sodium triformatoborohydride, $NaBH(O_2CH)_3$.

No references cited.